J. M. YOUNT.
WELDED RAIL BOND AND FISH PLATE.
APPLICATION FILED FEB. 15, 1912.
1,037,707.   Patented Sept. 3, 1912.
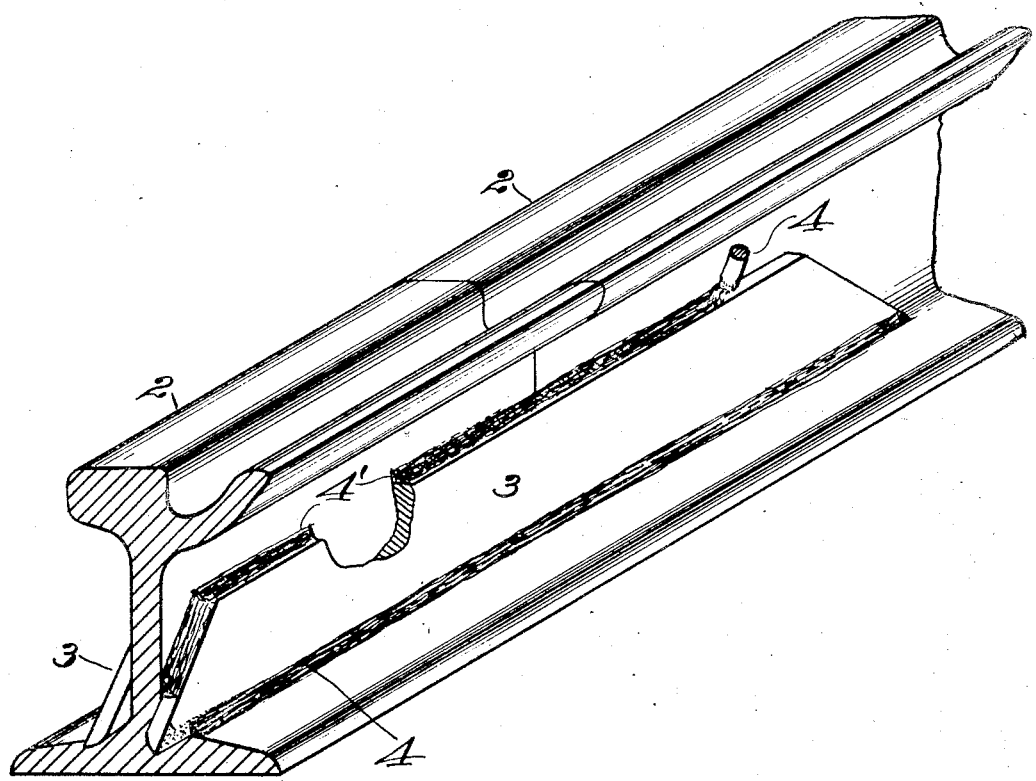
Witnesses:
F. E. Maynard.
J. H. Herring.
Inventor:
Jesse M. Yount,
By G. H. Strong.
Atty

UNITED STATES PATENT OFFICE.

JESSE MORTON YOUNT, OF SAN FRANCISCO, CALIFORNIA.

WELDED RAIL-BOND AND FISH-PLATE.

1,037,707.  Specification of Letters Patent.  Patented Sept. 3, 1912.

Application filed February 15, 1912. Serial No. 677,845.

*To all whom it may concern:*

Be it known that I, JESSE MORTON YOUNT, a citizen of the United States, residing in the city and county of San Francisco and State of California, have invented new and useful Improvements in Welded Rail-Bonds and Fish-Plates, of which the following is a specification.

This invention relates to electric bonds and fish plates for railway rails.

The object of the present invention is to provide an electrical bond and fish plate which may be readily applied to rails in position, without interrupting the car service or use of the rails while the installation of the bonds is proceeding.

It is a particular object of the present invention to provide an electrical bond and fish plate, whereby the abutting or adjacent ends of railway rails may be so thoroughly connected that a perfect conductivity of electricity is produced between the adjacent rails; the present design of bond and fish plate being further provided to obviate the use of bolts, lugs, bosses, or other extraneous projections or devices whatsoever, the improved fish plate being of such character as to be applied flat against the sides of abutting or adjacent rails by the application of a fused material, attaching it firmly and substantially to the sides of the webs of the rails. The fish plate thus attached to the rails forms a powerful, rigid and practically indestructible connection between the rails.

The invention consists of the parts and the construction and combination of parts as hereinafter more fully described and claimed, having reference to the accompanying drawing, in which the figure is a perspective view of adjacent ends of alined rails with the fish plates applied to the web sides.

It is desirable to provide and obtain a simple fish plate for connecting rail ends which fish plate will not only serve as a rigid support or tie between the rails, but will also have great efficiency as an electric conductor or bond between the rails. I have found by actual demonstration that the rails 2 may be substantially and effectually connected by flat metal plates 3 of suitable length, width and thickness, by means of an electrically or otherwise formed weld, when the metal which is deposited in the welding process is applied around the perimeter of the fish plate, where it rests against the web surfaces against which the fish plates 3 are to be applied.

The fish plate 3 may be of any efficient material having strength to form a substantial connection between the rail ends, and which material is in itself a good electric conductor. I have practised my invention by holding the fish plates 3 against the adjacent ends of the rails 2, the fish plate extending over each of the rails across the joint between their ends.

In practice, I apply the material indicated by the pencil 4, through which may be sent a current of electricity, causing the end of the pencil to fuse when the arc is created as the pencil is held in juxtaposition to the rail, the latter acting as a ground for the electricity.

This system of bonding and connecting the two adjacent rail ends is simple, comparatively inexpensive, and produces a tie and bond of great efficiency and particularly since the material forming the weld 4' may be applied entirely around the perimeter of the fish plate 3. During the fusing of the material from the pencil, I have found that the material of the rail and the adjacent edges of the fish plate is just sufficiently fused to make a perfect bond with the material forming the fillet and bond around the perimeter of the fish plate 3, this being cut angularly on its ends, thus affording a surface better adapted to hold the fused metal of pencil 4 than if the ends were at right angles to the side edges.

Having thus described my invention, what I claim and desire to secure by Letters Patent is—

1. A rail joint comprising adjacent substantially alined rail-ends, and a splicing plate overlapping the adjacent rail-ends on one side of the rails, said plate being of less height than the web of the rail and having its ends inclined upwardly and inwardly so that the upper and longitudinal edge of the plate is shorter than the lower longitudinal edge, said plate being connected to the rail-ends by a continuous weld, capable of sustaining all of the load imposed upon the rails.

2. A rail joint comprising adjacent substantially alined rail-ends, and a splicing plate overlapping the adjacent rail-ends on one side of the rails, said plate being of less height than the web of the rail and having its ends inclined upwardly and inwardly so that the upper and longitudinal edge of the plate is shorter than the lower longitudinal edge, said plate being connected to the rail-ends by a continuous weld, capable of sustaining all of the load imposed upon the rails, the angle of the ends being sufficient to retain the molten material while the joint is being welded.

3. A rail joint including the contiguous ends of substantially alined rails, a splicing plate overlapping the ends and bearing upon the webs of the rails, said plate being provided with inclined end edges and the plate being of less height than the web of the rails, and a weld extending continuously along the bottom of the plate adjacent its contact with the base of the rail, thence upwardly over each inclined end of the plate and thence along the upper edge of the plate adjacent the contact between the shorter upper edge of the plate and the sides of the webs of the rails.

In testimony whereof I have hereunto set my hand in the presence of two subscribing witnesses.

JESSE MORTON YOUNT.

Witnesses:
   THOS. FINIGAN,
   F. E. MAYNARD.